No. 777,107. PATENTED DEC. 13, 1904.
H. KENYON.
GRINDING MACHINE.
APPLICATION FILED DEC. 29, 1903.
NO MODEL. 2 SHEETS—SHEET 1.
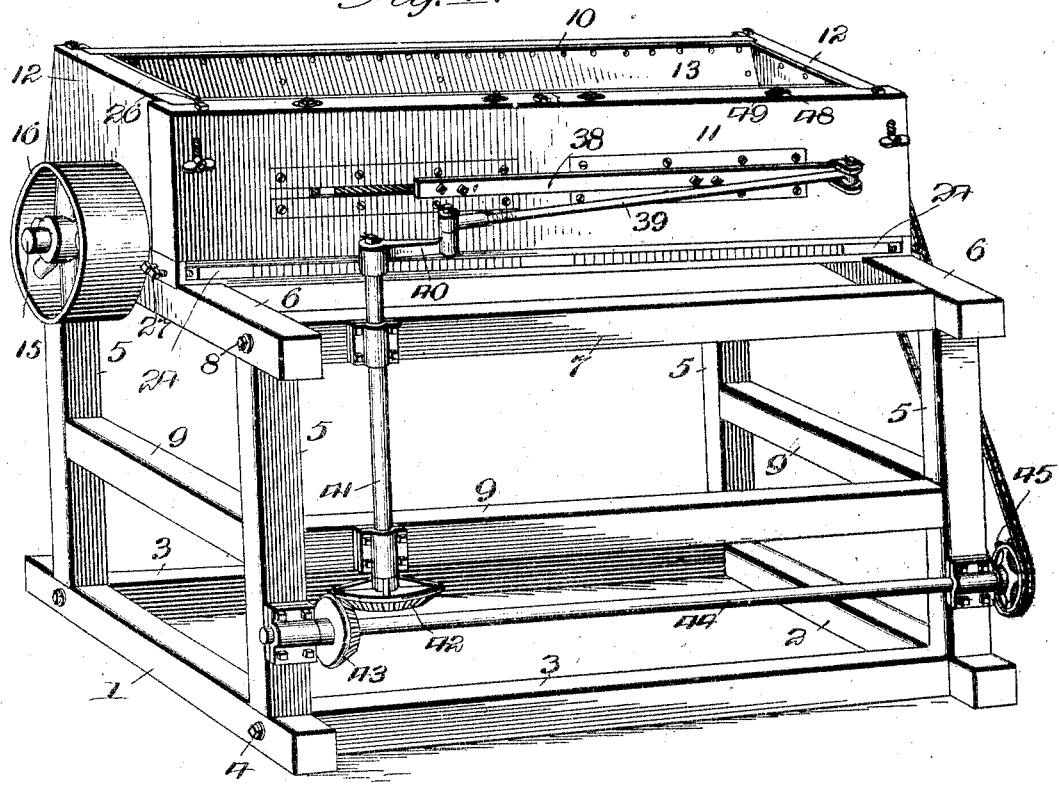
Fig. 1.
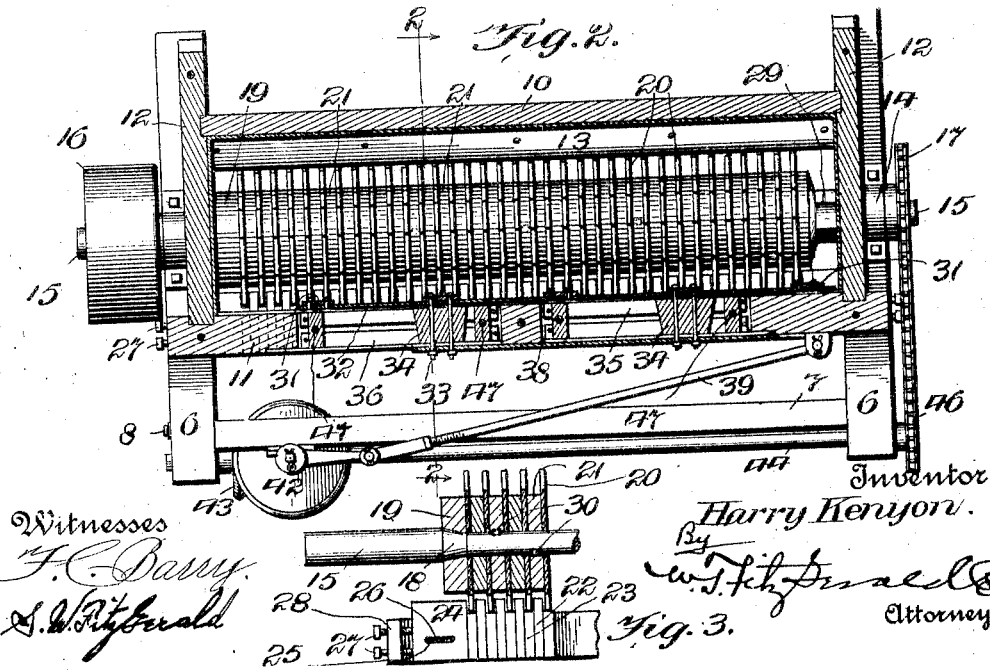
Fig. 2.
Fig. 3.
Witnesses
F. C. Barry
A. W. Fitzgerald
Inventor
Harry Kenyon
By W. T. Fitzgerald
Attorneys.

No. 777,107. PATENTED DEC. 13, 1904.
H. KENYON.
GRINDING MACHINE.
APPLICATION FILED DEC. 29, 1903.
NO MODEL. 2 SHEETS—SHEET 2.
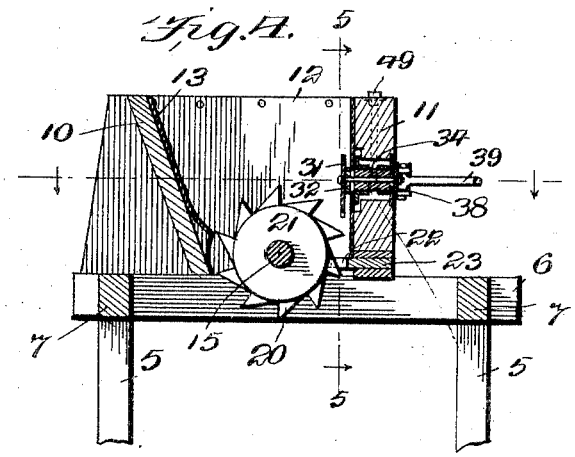
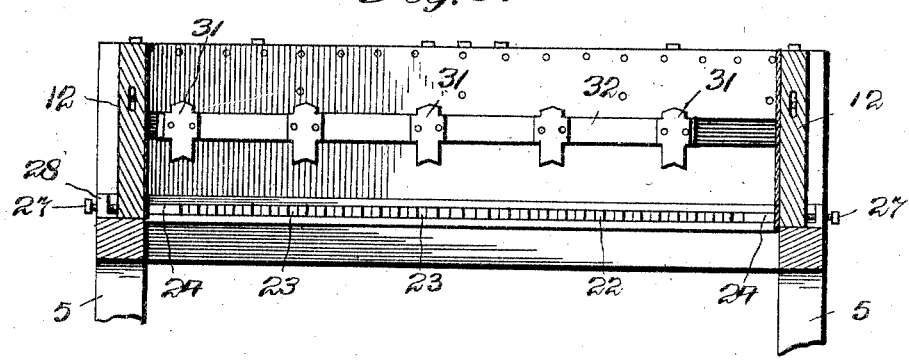
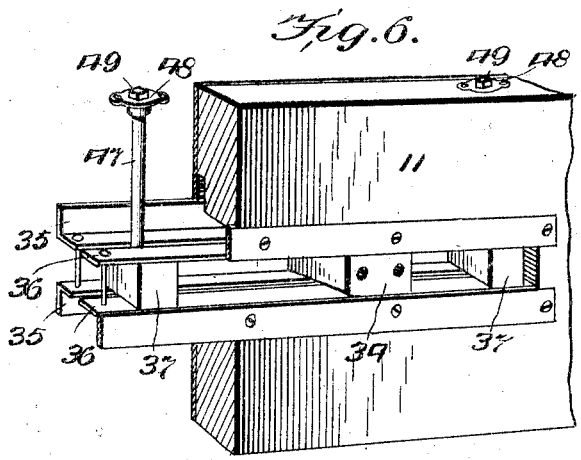
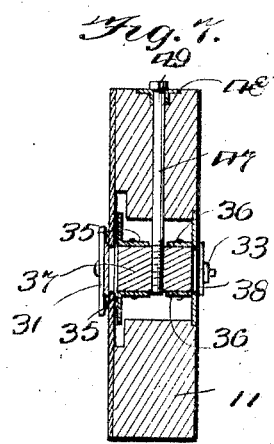
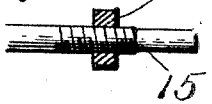
Witnesses
F. C. Barry
A. W. Fitzgerald
Inventor
Harry Kenyon
By W. T. Fitzgerald
Attorneys No. 777,107.  
Patented December 13, 1904.

UNITED STATES PATENT OFFICE.

HARRY KENYON, OF MAPLEPARK, ILLINOIS.

GRINDING-MACHINE.

SPECIFICATION forming part of Letters Patent No. 777,107, dated December 13, 1904.

Application filed December 29, 1903. Serial No. 187,006. (No model.)

*To all whom it may concern:*

Be it known that I, HARRY KENYON, a citizen of the United States, residing at Maplepark, in the county of Kane and State of Illinois, have invented certain new and useful Improvements in Grinding-Machines; and I do hereby declare the following to be a full, clear, and exact description of the invention, such as will enable others skilled in the art to which it appertains to make and use the same.

My invention relates to corn-crushing machinery, and more particularly to that variety thereof designed to disintegrate ear-corn, whereby the grain will be shelled and the cob itself will be thoroughly divided into minute particles, thus fitting the same as a very desirable food for stock of all kinds; and my invention consists of certain novel features of construction and combination of parts, as will be hereinafter clearly set forth, and pointed out in the claims.

The object of my invention, among others, is to provide a reliably-efficient mechanism of the character specified, the parts of which may be comparatively cheaply and expeditiously manufactured and assembled each in its respective operative place.

A further object of my invention is to provide mechanism which will prove efficient in the grinding or crushing of ear-corn or grain upon the stalk, thoroughly shredding the latter without the expensive and dangerous addition of a fly-wheel or balance-wheel to attain the requisite momentum of the cutting or grinding parts.

A further object is to provide simple means to attain quick adjustment of the coöperating cutting-teeth in order to compensate for wear thereof.

Other objects and advantages will be hereinafter made clearly apparant, reference being had to the accompanying drawings, which are made a part of this application, and in which—

Figure 1 is a perspective view of my invention complete ready for use. Fig. 2 is a top plan view of the cutting part of my invention, showing a portion of the hopper in section. Fig. 3 is a detail view showing a portion of the grinding or shredding cylinder in section and the relative arrangement thereof to the stationary coöperating parts or teeth. Fig. 4 is a sectional view of Fig. 2 on line 2 2. Fig. 5 is a longitudinal section of the hopper, showing the revoluble grinding teeth or disks removed. Fig. 6 is a perspective view showing a portion of the hopper containing the adjusting mechanism carrying the reciprocating feeding members or teeth. Fig. 7 is a transverse section of the parts shown in Fig. 6; and Fig. 8 is a detail view of the opposite end of the shaft to that shown in Fig. 3, showing the jam-nut to lock the disks thereon.

For convenience in referring to the various details of my invention and accessories deemed necessary to show a practical application thereof to use numerals will be employed, the same numeral referring to a similar part throughout the several views.

Referring to the numerals on the drawings, 1 and 2 designate end sections of the base, while 3 designates the side sections thereof, said parts being properly locked in coöperative relationship, as by the bolts or screws 4. Suitable uprights or standards 5 are erected upon the base-section thus constructed, and upon the upper end thereof the platform members comprising the end sections 6 and the side sections 7 are secured and held together in any preferred way, as by the bolts 8, all of said parts being locked or reinforced in rigid relationship, as by the bracing members 9, as clearly shown in Fig. 1. Upon the support thus constructed I mount the hopper of my grinding or shredding mill, which comprises the side members 10 and 11 and the end sections 12, all of said parts being properly secured together in any desired manner. The inner surface of the hopper thus or otherwise constructed is properly lined or faced with metallic sheathing 13, and within the hopper I mount in suitable bearings 14 the driving-shaft 15, extending entirely through each end of the hopper-section, and upon one end of the shaft I locate the driving-wheel 16 and upon the other end a sprocket or band wheel 17 for a purpose hereinafter made clear.

I desire to call particular attention to the construction of the interior or grinding parts of the hopper, and, referring to Fig. 3 and other views, it will be observed that one end of the shaft 15, upon which the driving-pulley 16 is mounted, is of slightly larger diameter than the other end thereof, the reduction in size of the shaft being indicated by the numeral 18 in Fig. 3. The conical section 18 of the shaft is designed to fit the bore of the disk 19, which is designed to act as a shoulder or stop for other parts mounted on said shaft, as will be hereinafter made clearly apparent.

Upon the reduced portion of the shaft 15 I dispose a plurality of cutting-disks 20, each disk having a plurality of teeth and separated a preferably uniform distance from each other by the interposed disk members 21, the cutting-disks 20 being of suitable hardened steel, as will be obviously necessary, while the separating members or disks 21 may be of metal of any preferred character and each of proper thickness to separate the cutting knives or disks 20 a sufficient distance to fit between the stationary ribs or teeth 22, each of which is held uniformly separated to loosely receive the knives or teeth 20 by means of interposed blocks or plates 23. I also provide the end or clamping block 24, having a slotted opening 25 to receive an anchoring-lug 26, carried by a contiguous part of the frame-section, said block 24 being rendered adjustable by means of the set-screws 27, extending through the bracket 28, and it is therefore obvious that since the clamping-blocks 24 and set-screws 27 are duplicated at each end of the machine, as clearly shown in Fig. 5, the position of the teeth or rib-sections 22 may be readily adjusted to compensate for any change of position of the rotating cutting-teeth 20 and the interposed members 21. Upon the end of the shaft, opposite the member 19, I locate the jam-nut 29, it being understood that the end of the shaft may be threaded at this point to receive the same, and it therefore follows that after a full complement of cutting-disks 20 and interposed separating-sections 21 are disposed upon the shaft 15 the jam-nut 29 will be turned home against the last member 21, and thereby firmly lock all of said parts upon said shaft. It will thus be seen that in the absence of the jam-nut 29 the cutting-disks 20 would be left entirely loose upon the shaft 15, but that when said nut is turned tightly home said parts will be securely locked together. This construction and combination of parts just described is designed to compensate for the sudden stopping of any one of the cutting-disks in case a bolt or other foreign substance should be placed in the hopper, inasmuch as it is clear that only the disk or disks engaging the bolt will be stopped thereby, while the others will be permitted to rotate sufficiently to prevent the sudden stopping of the machine and the incident injury which would result. This construction is also very desirable and important, inasmuch as it will permit any injured disk to be readily removed and replaced.

By providing the interposed members or disk sections 21 of greatly larger diameter than the shaft 15 it will be seen that I provide what is substantially a heavy metal cylindrical shaft to carry the plurality of knives, this increased diameter over the shaft 15 being amply sufficient to compensate for the absence of the fly-wheel, inasmuch as the momentum of a rapidly-rotating cylinder or shaft of great size will provide sufficient impetus to carry the same through all ordinary resistances incident to grinding a mass of ear-corn, fodder, or the like.

In mounting the plurality of interposed members 21 upon the shaft 15 I prefer to key each alternate one or every second or third one of said members to said shaft, as indicated by the numeral 30, whereby the strain incident to a sudden stopping of the machine by an obstruction will be taken off of the jam-nut 29 and distributed throughout the plurality of keys 30, as will be obviously apparent.

It becomes desirable in order to insure a uniform feeding of the ear-corn to the plurality of cutting-knives 20 to provide suitable coöperating feeding devices, and with this purpose in view I provide a plurality of reciprocating teeth 31, which are carried by the bar 32, disposed parallel with the inner face of the hopper-section 11, as will be more clearly seen in Figs. 2 and 5. The bar 32 is connected, by means of the bolts 33, to the sliding blocks 34, which are designed to move in an adjustable frame, which comprises the angle-plates 35 and plates 36, properly secured together by being connected to the stationary blocks 37 and more clearly shown in Fig. 6. The bolts 33 are of sufficient length to extend through the bar 38 upon the outside of the hopper-section, said bar being operatively connected with the pitman 39, which latter is attached at one end to the crank 40 upon the shaft 41, the lower end of said shaft being provided with a beveled gear 42, which meshes with a similar gear 43 upon the shaft 44, the latter being mounted in suitable bearings upon the standards 5. The shaft 44 is driven by means of the sprocket-wheel 45, which is placed in connection with the sprocket 17 by the sprocket-chain 46 or other equivalent means, and it therefore follows that when the shaft 15 and the parts carried thereby are rotated the shaft 44 will be turned and incidentally communicate motion to the shaft 41, thereby causing the reciprocation of the plurality of teeth 31.

Inasmuch as it will become desirable at times to adjust the downward reach of the teeth 31, I provide a threaded seat in the blocks 37 to receive the end of the bolt 47, the upper end of which is passed loosely through the plate 48, which latter is secured to the upper edge of the section 11 of the hopper, the upper end of the bolt 47 being square, as indicated by the numeral 49, whereby a wrench may be applied to rotate the bolt in either direction and incidentally raise or lower the block 37, and thereby carry the plates 35 and 36 upward or downward, as desired, and incidentally adjust the path of reciprocation of the blocks 34. By this adjustability it is therefore obvious that the position of the teeth 31 relative to the floor or bottom of the hopper may be readily attained, the office of said teeth being, as hereinbefore stated, to agitate the contents of the hopper at the point of reciprocation, whereby the ear-corn or the like will be directed in the path of the teeth upon the grinding-disks.

It will thus be seen that I have provided a very efficient mechanism of comparatively simple construction which will reliably perform the office of breaking into small pieces ear-corn, or corn upon the cob, and that the grain will therefore be shelled from the cob and the latter thoroughly broken into particles of proper size to constitute an excellent variety of food for stock.

While the main use to which my machine may be placed will be that of grinding ear-corn, it will also be desirable and useful for cutting or shredding fodder and the ear-corn carried thereby. Should by accident a stone, piece of wood, bolt, or the like be introduced into the hopper, the rotation of the shaft 15 and the teeth carried thereby will not be instantly checked, inasmuch as the teeth are held only by frictional engagement arising from the pressure of the jam-nut, and when, therefore, more resistance is offered to the rotating disks 20 than that presented by an ear of corn or a stalk of fodder said disks so obstructed will be held idle, while the momentum will carry the remaining teeth in rotation until the machine is gradually stopped, thereby obviating the sudden strain and jar which might otherwise result if all of said cutting-disks 20 were keyed rigidly to their shaft.

While I have described the preferred combination and construction of parts deemed necessary in carrying out my invention, I desire to secure such substantial equivalents and substitutes as may be regarded as fairly falling within the scope of my invention.

Believing that the construction and manner of using my invention have thus been made clearly apparent, further description is deemed unnecessary.

What I claim as new, and desire to secure by Letters Patent, is—

1. In a grinding-mill the combination with a hopper and a plurality of cutting-disks rotatably mounted therein of a feeding device comprising reciprocating fingers, a bar on the inner side of said hopper, carrying said fingers, sliding blocks and means carried by said hopper to secure said bar thereto, an adjustable frame to receive said blocks, means to adjust said frame vertically, a bar 38 on the outer side of said hopper, also secured to said blocks, a pitman pivotally secured to one end of said bar 38, driving mechanism secured to the opposite end of said pitman and means to actuate said mechanism whereby said fingers will be reciprocated, as set forth.

2. In a grinding-mill having a hopper, a plurality of fingers disposed in said hopper, a bar 32 disposed parallel with the inner face of said hopper, said fingers being secured to said bar, a bar 38 disposed parallel with the outer side of said hopper, sliding blocks interposed between said bars, means to secure said bars to said blocks, a frame for said blocks located in a slot in the wall of said hopper said frame comprising the angle-plates 35 and plates 36, arranged in pairs, stationary blocks interposed between each pair of plates, and means carried by said hopper coöperating with said stationary blocks to raise and lower said fingers, and additional means to cause said fingers to reciprocate, substantially as and for the purpose set forth.

In testimony whereof I affix my signature in presence of two witnesses.

HARRY KENYON.

Witnesses:
L. C. CLYNE,
MILTON J. BEVERLY.